(No Model.)
W. P. SMITH.
SCREW JACK.
No. 302,598. Patented July 29, 1884.
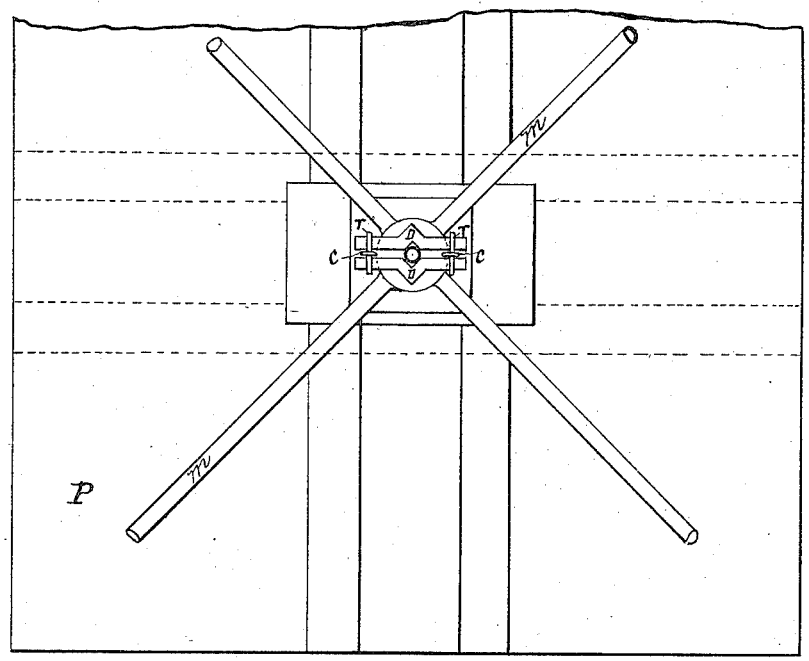
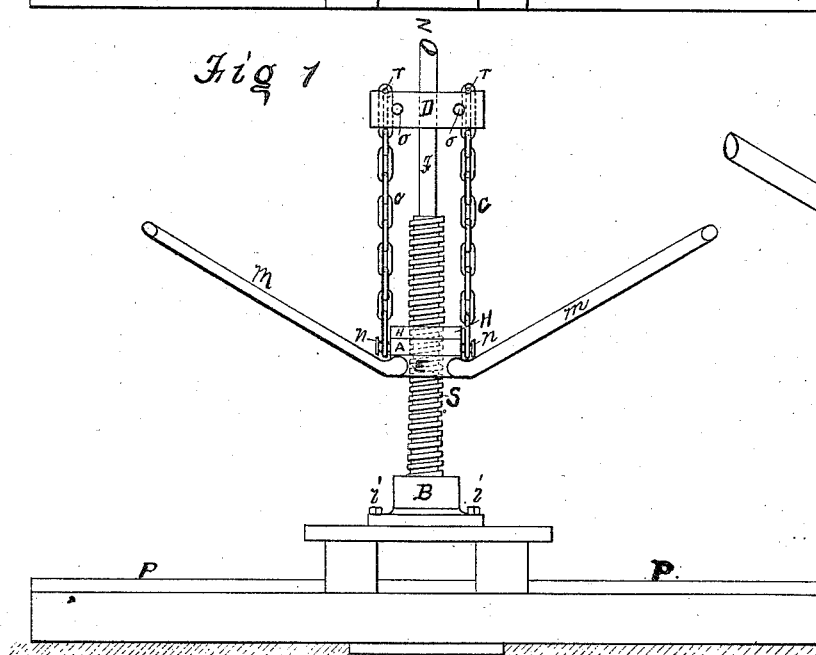
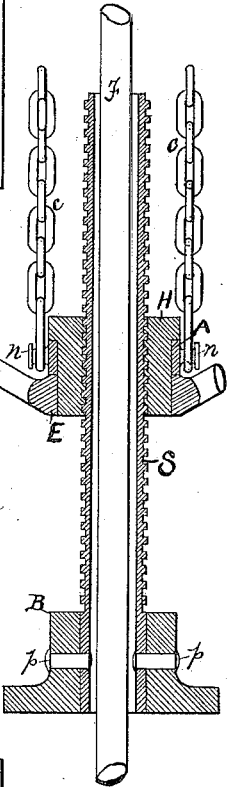

UNITED STATES PATENT OFFICE.

WILLIAM P. SMITH, OF NEW ORLEANS, LOUISIANA.

SCREW-JACK.

SPECIFICATION forming part of Letters Patent No. 302,598, dated July 29, 1884.

Application filed June 4, 1884. (No model.)

*To all whom it may concern:*

Be it known that I, WILLIAM P. SMITH, a citizen of the United States, residing in the city of New Orleans, parish of Orleans, State of Louisiana, have invented a new and useful Screw-Jack for Forcing Down Pipes for Sinking Wells, &c., of which the following is a specification.

My improvement relates to improvements in a screw-jack in which the screw is made hollow to admit of a pipe passing through it; and the object of my invention is to provide a means by which the power of a screw-jack can be applied directly to the pipe to be forced into the ground and maintain the pipe in a perfectly perpendicular position. I attain this object by the mechanism illustrated in the accompanying drawings, forming part of this specification, in which—

Figure 1 is a side elevation of the jack; Fig. 2, a plan view; Fig. 3, a section through plane N N, Fig. 1.

Similar letters refer to similar parts throughout the several views.

The hollow screw S is secured to the base-plate B by pins $p$ $p$, the base-plate B being secured to a platform, P, by the bolts $i$ $i$. The nut H is provided with a ring, A, which is made to revolve easily on the nut H, and is provided with the two journals N N, to which are attached the chains $c$ $c$. The bottom of nut is made hexagon-shaped to receive the spanner E, provided with the arms M M. The chains $c$ $c$ are attached to the clamp D by the rods $r$ $r$.

The operation is as follows: The machine being placed over the location where the pipe is to be driven, the platform P is then loaded with rocks or heavy weights, the weight on platform P being more than equal to the force required to drive the pipe, to keep the machine from lifting. The pipe, F, to be driven is placed in the hollow screw S, and the nut H run up to top of screw and the clamp D thoroughly secured to the pipe by the bolts $o$ $o$, the chains $c$ $c$ being long enough to admit of the nut H being run to bottom of screw S before clamp D will reach the top of screw. By turning the nut H by the spanner E the pipe F is forced into the ground until the nut H reaches the bottom of the screw S, when the clamp D is loosened and nut run up and another hold taken on the pipe F.

What I claim as new, and desire to secure by Letters Patent, is—

In a screw-jack for driving pipe, the combination of the hollow screw S, secured to the base B by pins $p$, with the nut H, provided with ring A, having journals N N and spanner E, chains $c$ $c$, and clamp D, all substantially as set forth, for the purpose specified.

W. P. SMITH.

Witnesses:
 J. THAYER,
 E. JOHNSON.